United States Patent
Kim et al.

(10) Patent No.: US 8,040,523 B2
(45) Date of Patent: Oct. 18, 2011

(54) MEASUREMENT METHOD OF CHROMATIC DISPERSION OF OPTICAL BEAM WAVEGUIDE USING INTERFERENCE FRINGE MEASUREMENT SYSTEM

(75) Inventors: Kyong Hon Kim, Yeonsu-gu (KR);
Seunghwan Kim, Nam-gu (KR);
Seounghun Lee, Namdong-gu (KR);
Elhang Lee, Goyang (KR)

(73) Assignee: INHA-Industry Partnership Institute, Incheon (KR)

(*) Notice: Subject to any disclaimer, the term of this patent is extended or adjusted under 35 U.S.C. 154(b) by 159 days.

(21) Appl. No.: 12/511,803

(22) Filed: Jul. 29, 2009

(65) Prior Publication Data
US 2010/0134787 A1    Jun. 3, 2010

(30) Foreign Application Priority Data
Dec. 1, 2008  (KR) .................. 10-2008-0120439

(51) Int. Cl.
*G01B 9/02* (2006.01)
*G01J 3/45* (2006.01)
*G01N 21/00* (2006.01)

(52) U.S. Cl. .................. 356/477; 356/73.1; 356/451

(58) Field of Classification Search .............. 356/73.1, 356/477, 451
See application file for complete search history.

(56) References Cited

U.S. PATENT DOCUMENTS

| | | | | |
|---|---|---|---|---|
| 5,227,623 | A * | 7/1993 | Heffner ..................... | 250/225 |
| 6,882,410 | B2 | 4/2005 | Asahina et al. | |
| 6,943,871 | B1 | 9/2005 | Abedin | |
| 7,256,876 | B1 * | 8/2007 | Boroditsky et al. ....... | 356/73.1 |
| 7,369,773 | B2 * | 5/2008 | Weiner ....................... | 398/81 |
| 7,414,711 | B1 * | 8/2008 | Boroditsky et al. ....... | 356/73.1 |
| 7,689,125 | B2 * | 3/2010 | Weiner ....................... | 398/81 |
| 7,773,207 | B1 * | 8/2010 | Boroditsky et al. ....... | 356/73.1 |
| 2004/0234186 | A1 * | 11/2004 | Nelson ....................... | 385/11 |

(Continued)

OTHER PUBLICATIONS

Lee et al., "Versatile chromatic dispersion measurement of a single mode fiber using spectral white light interferometry," Optics Express, Nov. 27, 2006, vol. 14, No. 24, pp. 11608-11615.

(Continued)

*Primary Examiner* — Patrick J Connolly
(74) *Attorney, Agent, or Firm* — Drinker Biddle & Reath LLP (57) ABSTRACT

The present invention relates to a measurement method of the chromatic dispersion of an optical waveguide using an optical interferometer with a broadband multi-wavelength light source and an optical spectrum analyzing apparatus, wherein one arm, called "reference arm" of the interferometer's two arms has an adjustable air spacing and the other arm, called "sample arm" can contain said optical waveguide to be measured, and including the following measurement and analysis steps: measuring interference spectra of the optical beam output exiting from the said interferometer with an optical spectrum analyzing apparatus when said optical waveguide is connected to said sample arm, and when said optical waveguide is not connected to said sample arm respectively; by adjusting the reference arm length for appearance of clear interference patterns; converting the wavelength-domain interference spectra into frequency-domain interference spectra and calculating phase difference values of the interference peaks of one of the spectra from a predetermined reference peak as a function of the frequency change by counting the interference peak (or valley) points; finding a Taylor series curve fit function for each set of the phase difference value data corresponding to each of the two interference spectra; and calculating a chromatic dispersion coefficient of the optical waveguide by using the coefficients of the Taylor series curve fit functions.

14 Claims, 6 Drawing Sheets

U.S. PATENT DOCUMENTS

2009/0196477 A1* 8/2009 Cense et al. .................. 382/131

OTHER PUBLICATIONS

Lee et al., "Spectrum-sliced Fourier-domain low-coherence interferometry for measuring the chromatic dispersion of an optical fiber," Applied Optics, Oct. 10, 2007, vol. 46, No. 29, pp. 7289-7296.

Cohen et al., "Comparison of Single-Mode Fiber Dispersion Measurement Techniques," Journal of Lightwave Technology, Oct. 1985, vol. LT-3, No. 5, pp. 958-966.

Shang, "Chromatic Dispersion Measurement by White-Light Interferometry on Metre-Length Single-Mode Optical Fibres," Electronics Letters, Aug. 20, 1981, vol. 17, No. 17, pp. 603-605.

* cited by examiner

MEASUREMENT METHOD OF CHROMATIC DISPERSION OF OPTICAL BEAM WAVEGUIDE USING INTERFERENCE FRINGE MEASUREMENT SYSTEM

CROSS-REFERENCE TO RELATED APPLICATIONS

This application claims the benefit of Korean Patent Application No. 10-2008-0120439, filed with the Korean Intellectual Property Office on Dec. 1, 2008, the disclosure of which is incorporated herein by reference in its entirety.

BACKGROUND

1. Technical Field

The present invention relates to a method of measuring the chromatic dispersion of an optical beam waveguide (hereinafter referred to as "optical waveguide") using interference fringes of an optical interferometer, more specifically to a method of measuring the chromatic dispersion coefficient of an optical waveguide using interference fringes of an optical interferometer which allows a simple and precise measurement of a chromatic dispersion property of an optical waveguide having a short length or a small chromatic dispersion value without using a complicated measuring equipment.

2. Description of the Related Art

The chromatic dispersion of an optical waveguide is one of major parameters that influence the generation efficiency of a non-linear optical effect as well as the high-speed transmission performance of optical signals. Accordingly, it is important to precisely measure the chromatic dispersion.

There are several prior arts to measure the chromatic dispersion of an optical waveguide, which are a time of flight method, a phase shift measuring method, and an interferometer-type method.

Firstly, the "Time-of-Flight Method" measures wavelength dependent time delays of optical pulses when the optical pulses of various wavelengths are sent through an optical fiber. This method, however, is sensitive to the time jitter and the wavelength stability of the laser, and requires a high stability even in a complicated experimental structure.

Secondly, the phase shift measuring method measures a wavelength dependent phase delays after phase-modulated optical signals are allowed to pass through a long optical fiber. However, this method has a difficulty in measuring an accurate phase delay when the measurement wavelength is apart from a reference wavelength and the phase delay is large. In addition, this method has another disadvantage related to a complicated measurement setup requirement.

On the other hand, the interferometer-type measuring method measures chromatic dispersions by using an interferometer which allows a precise measurement of wavelengths, refractive indexes, lengths, and detailed spectral patterns of a light wave based on its optical interference phenomenon.

One of prior arts related to the interferometer-type measuring method [L. G. Cohen, J. Lightwave Technol., 3, 958-966 (1985)] uses a scheme of Mach-Zehnder interferometer. This method allows measurement of an absolute value of chromatic dispersion of an optical sample waveguide or fiber placed on a sample arm with an optical fiber or a waveguide having a known chromatic dispersion value placed on a reference arm and with temporal measurement of interference patterns in a time-domain when the length of the reference arm is adjusted appropriately with respect to the length of the optical sample fiber or waveguide placed on the sample arm. This method also has a drawback of requiring a reference optical fiber or a waveguide of known chromatic dispersion value to obtain an absolute chromatic dispersion value of a sample.

In another prior art related to the interferometer-type measuring method [H.-T. Shang, Electron. Lett., 17, 603-605 (1981)], a similar shape of the Mach-Zehnder interferometer as one mentioned above in the prior art [L. G. Cohen, J. Lightwave Technol., 3, 958-966 (1985)] is applied except without using any known reference waveguide or fiber, but the chromatic dispersion of the sample is determined by measuring the center of flat interference spectrum pattern which corresponds to a wavelength of zero signal delay between the reference arm beam and the sample arm beam and which is observed when the reference arm length is adjusted, and by measuring how the wavelength of zero signal delay varies with change of the reference arm length. However, since the output of the interferometer varies very sensitively to environmental instability, it is not easy to measure the wavelength of zero signal delay for both reference and sample arm beams. This kind of sensitivity to the environmental instability causes experimental measurement errors.

Yet, another prior art related to the interferometer-type measuring method described in [J. Y. Lee and D. Y. Kim, Optics Express, 14 (24), 11608-11615 (2006)] and [J. Y. Lee and D. Y. Kim, Applied Optics, 46 (29), 7289-7296 (2007)] reports measured results of the chromatic dispersion of a 55 cm-length optical fiber by using only a sample fiber placed in a Mach-Zehnder interferometer. However, this method has a drawback of a limited accuracy in measurement of the chromatic dispersion of an optical fiber or waveguide whose length is shorter than 55 cm or whose dispersion value is very small, because this method does not count any background effect in the interference pattern and phase change measurement.

Another prior art of chromatic dispersion measurement described in the patent document [U.S. Pat. No. 6,882,410] suggests a method that evaluates the minimum and maximum chromatic dispersion values of a sample by comparing the correlation between the reference signal having a known chromatic dispersion and a signal outputted from an optical time-domain reflector (OTDR). This method, however, is inconvenient in that an OTDR must be used, and the comparison with a known chromatic dispersion must be performed, and is limited to evaluation of a relative minimum and maximum chromatic dispersion instead of obtaining the absolute chromatic dispersion.

In addition, another prior art of chromatic dispersion measurement described in the patent document [U.S. Pat. No. 6,943,871] suggests a method that evaluates the chromatic dispersion from the change of the interferometer output according to the modulation frequency of an optical modulator in a Sagnac loop interferometer. However, this method is unable to make a detail suggestion for measuring the chromatic dispersion of an optical fiber or optical waveguide having a short length.

Recently the precise measurement of the chromatic dispersion is required to maximize the nonlinear effect in a silicon optical waveguide. The length of the silicon optical waveguide is about several centimeters or smaller. However, the aforementioned documents related to prior arts on measurement of the chromatic dispersion do not provide any solution for precise measurement of chromatic dispersion of the optical waveguide having a length of several centimeters or smaller.

SUMMARY

The present invention, which is contrived to solve the aforementioned problems related to the prior arts, provides a measurement method of the chromatic dispersion of an optical waveguide using an optical interferometer, for an example, a Mach-Zehnder interferometer, which consists of the followings: a broadband multi-wavelength light source, an optical beam splitter distributing optical beams transferred from a light source to a reference arm having an adjustable transmission length and to a sample arm having an optical sample waveguide to be measured, and an optical beam combiner to combine the two distributed beams so that they form an interference pattern, and including the following measurement and analysis steps: measuring interference spectra of the optical beam output exiting from the said interferometer with an optical spectrum analyzing apparatus when said optical waveguide sample is connected to said sample arm, and when said optical waveguide sample is not connected to said sample arm respectively, by adjusting the reference arm length to observe a clear interference pattern for each case; converting the wavelength-domain interference spectra into frequency-domain interference spectra and calculating phase difference values of the interference spectra from a predetermined reference frequency as a function of the frequency change by counting the interference peak (or valley) points; finding a Taylor series curve fit for each set of the phase difference value data corresponding to each of the two interference spectra; and calculating a chromatic dispersion coefficient of the optical waveguide by using the coefficients of the Taylor series curve fit functions.

During the measurement of optical interference spectra stated above, each spectrum can be taken with the optical spectrum analyzing apparatus at a condition that the optical transmission length through the reference arm is adjusted to observe a relatively clear interference pattern. Here, the condition that the optical transmission length through the reference arm is adjusted to observe a relatively clear interference pattern can be any one of two cases that the visibility of the interference pattern is the maximum or differences between the background noise level and the maximum peak point level are of the maximum values.

The reference arm contains an optical beam collimator, transmitting the optical beam from the optically guided path of the reference arm into an air, and an optical beam collector, receiving the optical beam transmitted through the air to an optically guided path, and the transmission length of optical beam in the air can be adjusted by controlling a distance between the optical beam collimator and the optical beam collector. Here, at least one of the optically guided path between the optical beam collimator and an optical beam splitter and the optically guided path between the optical beam collector and the optical beam combiner can be made of an optical fiber.

The sample arm can comprise a first connector, close to the beam splitter, and a second connector, close to the beam combiner, which are connected to either end of the optical sample waveguide to be measured or connected to each other, in order to transfer the optical beam. Here, at least one of an optically guided path between the first connector, close to the beam splitter, and the optical beam splitter and another optically guided path between the second connector and the optical beam combiner can be made of an optical fiber.

The optical beam collimator and the optical beam collector can be any one pair of optical collimators or GRIN lenses.

The first connector, close to the beam splitter and the second connector, close to the beam combiner, can be any one pair of optical connectors or fusion spliced ports.

Therein the optical beam splitter and the optical beam combiner can be optical fiber couplers.

The present invention, which is contrived to solve the aforementioned problems related to the prior arts, provides a measurement method of the chromatic dispersion of an optical waveguide using another optical interferometer, which consists of a broadband multi-wavelength light source, and an optical beam splitter distributing optical beams transferred from a light source to a reference arm, having an adjustable transmission length and reflecting and returning the transferred optical beams at the other end of the arm toward the beam splitter, and to a sample arm, having an optical sample waveguide to be measured and reflecting and returning the transferred optical beams at its opposite end of the reference arm toward the beam splitter, and enables the reflected and returned optical beams to combine together and to form an interference pattern, and including the following measurement and analysis steps: measuring interference spectra of the reflected and returned optical beam outputs at another input side optical port of the optical beam splitter or at the same optical beam input port with an optical circulator using an optical spectrum analyzing apparatus when said optical waveguide sample is connected to said sample arm, and when said optical waveguide sample is not connected to said sample arm respectively, by adjusting the reference arm length to observe a clear interference pattern for each case; converting the wavelength-domain interference spectra into frequency-domain interference spectra and calculating phase difference values of the interference spectra from a predetermined reference frequency as a function of the frequency change by counting the interference peak (or valley) points; finding a Taylor series curve fit for each set of the phase difference data corresponding to each of the two interference spectra; and calculating a chromatic dispersion coefficient of the optical waveguide by using the coefficients of the Taylor series curve fit functions.

During the measurement of optical interference spectra stated above, each spectrum can be taken with the optical spectrum analyzing apparatus at a condition that the optical transmission length through the reference arm is adjusted to observe a relatively clear interference pattern. Here, the condition that the optical transmission length through the reference arm is adjusted to observe a relatively clear interference pattern can be any one of two cases that the visibility of the interference pattern is the maximum or differences between the background noise level and the maximum peak point level are of the maximum values.

The reference arm contains an optical beam collimator, transmitting the optical beam from the optically guided path of the reference arm into an air and receiving a reflected optical beam back to the input optical path along the reference arm, and an optical reflector, reflecting the reference optical beam back toward the beam collimator, and the transmission length of optical signal in the air is adjusted by controlling a distance between the reflector and the optical beam collimator. Here, the optically guided path between the optical beam collimator and an optical beam splitter and combiner can be made of an optical fiber.

The sample arm can comprise a connector, being connected to one end of the optical sample waveguide to be measured and to transfer an optical beam to the optical sample waveguide, and a reflector, being in contact with or close to the other end of the optical sample waveguide, opposite to the one end to which the connector is connected, and reflecting and returning the optical beam back to the connector through the sample waveguide. For a background measurement the sample can be removed and the reflector is placed in contact with or close to the connector. Here, an optical path between the connector and the optical beam splitter and combiner can be made of an optical fiber.

The optical beam collimators and connectors can be optical collimators or GRIN lenses.

The connector can be an optical fiber connector or a fusion connecting port.

Each of the optical beam splitter and combiner can be an optical fiber coupler.

BRIEF DESCRIPTION OF THE DRAWINGS

FIG. 5 shows plots of chromatic dispersion curves of an optical sample waveguide calculated from measured interference pattern and phase difference values when the optical sample waveguide is comprised as shown in FIG. 1b with and without subtraction of the background effect which is obtained with the setup shown in FIG. 1a.

DETAIL DESCRIPTION

Hereinafter, a method of measuring the chromatic dispersion of an optical waveguide using an optical interferometer in accordance with an embodiment of the present invention will be described with reference to the accompanying drawings.

Figure 1A:
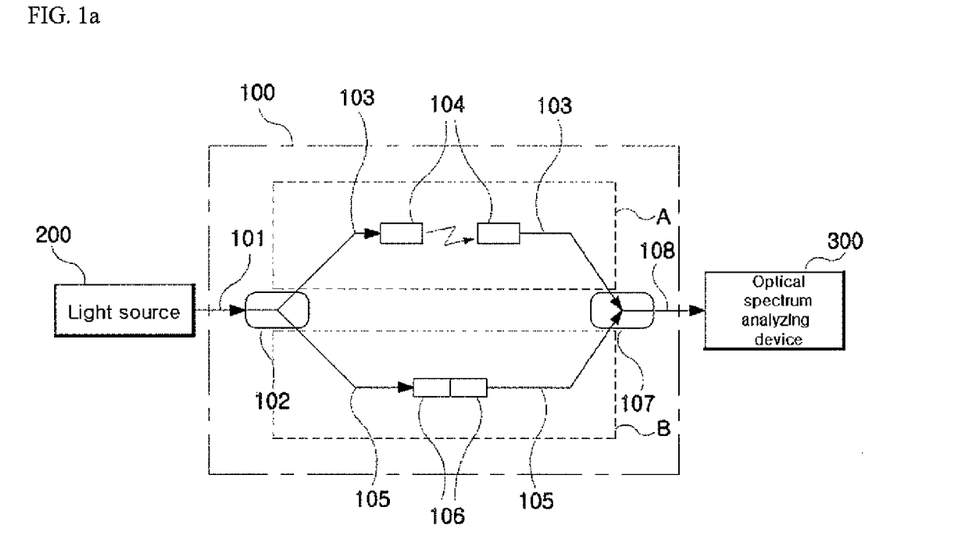
FIG. 1a and FIG. 1b show brief illustrative diagrams of optical interference pattern measuring schemes to explain a chromatic dispersion measuring method in accordance with an embodiment of the present invention.
Figure 1B:
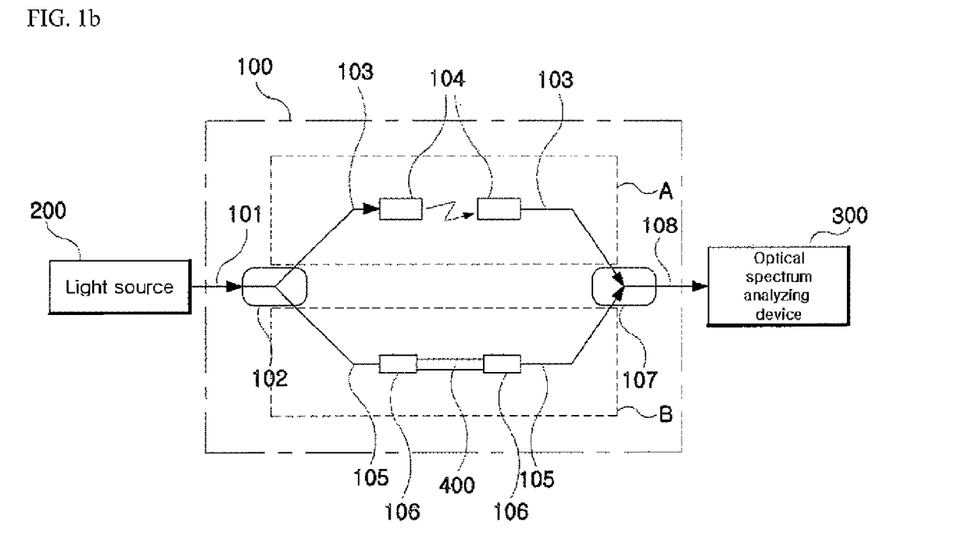

FIG. 1a and FIG. 1b show brief illustrative diagrams of an optical interference pattern measuring scheme to explain a chromatic dispersion measuring method in accordance with an embodiment of the present invention. In particular, FIG. 1a shows a brief diagram of the interference spectrum measurement scheme with no optical waveguide connected, and FIG. 1b shows a diagram of the interference spectrum measurement scheme with an optical sample waveguide connected. The optical interferometer scheme used in these figures is a Mach-Zehnder interferometer.

As shown in FIG. 1a and FIG. 1b, the interference pattern measuring system comprises a light source 200, a Mach-Zehnder interferometer 100, and an optical spectrum analyzing apparatus 300.

Here, the light source 200 delivers a multi-wavelength optical signal beam output.

The Mach-Zehnder interferometer 100 comprises: an optical beam splitter 102, splitting the optical beams inputted from the light source 200 to a reference arm A, in which the transmission lengths of optical signals can be changed in the air, and to a sample arm B, which is connected to an optical sample waveguide; and an optical beam combiner 107, combining the split optical beams to cause the interference.

The optical spectrum analyzing apparatus 300 receive the interfered optical beam output from the Mach-Zehnder interferometer 100 to analyze spectral profiles of the received beam.

Here, the reference arm A and the sample aim B comprise an optically guided path of the reference arm 103 and an optically guided path of the sample arm 105, respectively, each of which has a disconnected portion in the middle.

Optical collimators 104 are connected to each end of the disconnected portions of the reference arm's optically guided path 103 to transfer the optical signals in the air. As such, the transmission length of optical signal can be adjusted in the air in the reference arm A by controlling the distance between the two optical collimators 104. Here, since the length of the reference arm's optically guided path 103 is required to be adjustable, at least one of the reference arm's optically guided path 103, close to the optical beam splitter 102, and the reference arm's optically guided path 103, close to the optical beam combiner 107 can be an optical fiber. On the other hand, the distance between the optical collimators 104 can be adjusted when the optical collimators are supported by any outer structure(s) for stable measurement condition. Alternatively, a pair of GRIN lenses can be employed instead of the optical collimators 104.

An optical connector 106 can be connected to each end of the disconnected portion of the sample arm's optically guided path 105. The two optical connectors 106 can be connected to each other as shown in FIG. 1a, or an optical sample waveguide can be placed to make the connection with the two optical connectors 106 as shown in FIG. 1b. Here, since the optically guided path of the sample arm 105 is required to be flexible for the connection of the optical sample waveguide, at least one of the sample arm's optically guided path 105, close to the optical beam splitter 102, and the sample optically guided path 105, close to the optical beam combiner 107 can be an optical fiber. Alternatively, a pair of fusion splicing ports can be employed instead of the optical connectors 106.

The optical beam splitter 102 and the optical beam combiner 107 can be optical fiber couplers.

Figure 2:
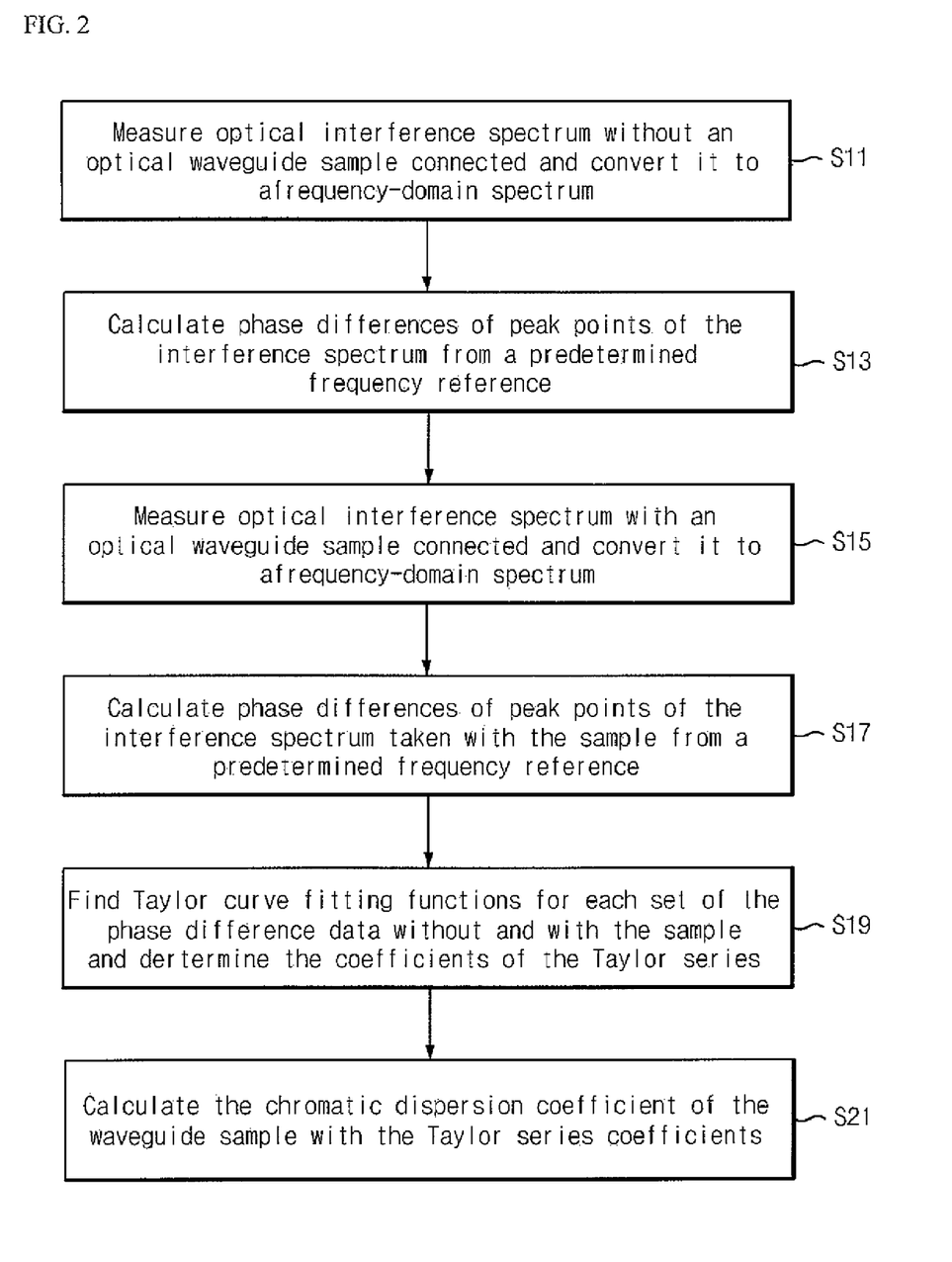
FIG. 2 is a brief flowchart showing a chromatic dispersion measuring method in accordance with an embodiment of the present invention.

FIG. 2 is a brief flowchart showing a chromatic dispersion measuring method in accordance with an embodiment of the present invention. Described below is a method of measuring the chromatic dispersion of an optical waveguide using an optical interferometer in accordance with an embodiment of the present invention, as illustrated in FIG. 2, with reference to the schemes shown in FIG. 1a and FIG. 1b.

Firstly, in the step S11 the optical interference spectrum is measured with the optical spectrum analyzing apparatus 300 when the optical waveguide 400 to be measured is not connected to the sample arm B as shown in FIG. 1a. For this measurement the optical interference spectrum is taken at a condition that the optical transmission length through the reference arm A is adjusted with the variable air spacing to observe a relatively clear interference pattern. The measured interference spectrum is converted into a frequency-domain interference spectrum. Here, the condition that the optical transmission length through the reference arm is adjusted to observe a relatively clear interference pattern can be any one of two cases that the visibility of the interference pattern is the maximum or differences between the background noise level and the maximum peak point level are of the maximum values.

Then, in the step S13 the optical interference spectrum is measured with the optical spectrum analyzing apparatus 300 when the optical waveguide 400 to be measured is connected to the sample arm B as shown in FIG. 1b. For this measurement the optical interference spectrum is taken at a condition that the optical transmission length through the reference arm A is adjusted again with the variable air spacing to observe a relatively clear interference pattern as described in the step S11. The measured interference spectrum is converted into a frequency-domain interference spectrum. Here, the condition for the clear interference spectrum is the same as that described in the step S11.

Next, in the step S15 the peak points of the interference pattern are extracted from each interference spectrum measured in the above steps S11 and S13, and the phase difference values of the peak points with respect to a reference wavelength (i.e., its corresponding frequency) are calculated as a function of frequency. Then, a Taylor series curve fit is made for the phase difference data of each interference spectrum.

Lastly, in the step S17 the chromatic dispersion property of the optical sample waveguide 400 is determined by using coefficients of the Taylor series curve fit function obtained from the case with the sample waveguide 400 connected and those without the sample waveguide connected.

Accordingly, the method of measuring the chromatic dispersion of an optical waveguide using an optical interferometer in accordance with an embodiment of the present invention is based on use of the relative phase difference between the cases with and without the optical waveguide 400 connected.

Hereinafter, the method of measuring the chromatic dispersion of an optical waveguide using a Mach-Zehnder interferometer in accordance with an embodiment of the present invention will be described in detail with reference to the formulae for obtaining the chromatic dispersion properties.

Firstly, the output electric fields caused by the optical signals passing through the reference arm A and the sample arm B of the Mach-Zehnder interferometer 100 when there is no optical waveguide as shown in FIG. 1a can be represented by the following formulae 1 and 2, respectively.

$$E_A = E_0 \exp(-j\beta_A L_A) \cdot \exp(-j2\pi f T_0) \cdot \exp(j2\pi f t) \qquad \text{Formula 1}$$

$$E_B = aE_0 \exp(-j\beta_B L_B) \cdot \exp(j2\pi f t) \qquad \text{Formula 2}$$

Here, $E_0$ refers to the electric field amplitude of an optical signal that is distributed to the reference arm A by the optical beam splitter 102, and a refers to the relative ratio of the electric field amplitude of the optical signal traveling through the sample arm B to that traveling through the reference arm A. $L_A$ and $L_B$ refer to the overall lengths of the reference arm's two separated optical paths 103 and the sample arm's two separated optical paths 105, respectively, of the Mach-Zehnder interferometer 100. $\beta_A$ and $\beta_B$ refer to the wave propagation constants of optical signals traveling through the optically guided path of the reference arm 103 and that of the sample arm 105, respectively, of the Mach-Zehnder interferometer 100. On the other hand, $T_0$ can be the time taken for a light beam to travel the air distance d between the optical collimators 104 of the reference arm A (i.e. $T_0 = d/c$). Here, c refers to the light speed in the air.

Moreover, the intensity of the optical signal beam that passes through the Mach-Zehnder interferometer 100 and is outputted through an output port 108 can be calculated by using the following formula 3.

$$I(f)[E_A + E_B]^2 = |E_0|^2(1+a^2) + 2a|E_0|^2 \cos(\phi(f)) \qquad \text{Formula 3}$$

Here, the phase difference $\phi(f)$ between the optical signals passing through the two arms A and B, respectively, according to the electric field wave can be represented as the following formula 4.

$$\phi(f) = (\beta_A L_A - \beta_B L_B) + 2\pi f T_0 = 2\pi f [\tau_{AB}(f) + T_0] \qquad \text{Formula 4}$$

If the formula 4, which shows the phase difference between the optical signals passing through the two arms A and B, respectively, according to the electric field wave, is represented by using the time delay $\tau_{AB}(f)$ between the optical signals, then the following formula 5 will be defined.

$$\beta_A L_A - \beta_B L_B = 2\pi f \tau_{AB}(f) \qquad \text{Formula 5}$$

Moreover, if the Taylor series at a frequency $f_0$ is developed for the phase difference of the formula 4, it can be written as shown in the following formula 6:

$$\phi(f) = \phi(f_0) + \left|\frac{d\phi}{df}\right|_{f=f_0} \cdot (f - f_0) + \qquad \text{Formula 6}$$

$$\frac{1}{2}\left|\frac{d^2\phi}{df^2}\right|_{f=f_0} \cdot (f - f_0)^2 + \frac{1}{6}\left|\frac{d^3\phi}{df^3}\right|_{f=f_0} \cdot (f - f_0)^3 + \ldots$$

Here, $\phi(f_0)$ is represented as shown in the formula 7:

$$\phi(f_0) = 2\pi f_0 [\tau_{AB}(f_0) + T_0] \qquad \text{Formula 7}$$

Next, when the optical waveguide 400 to be measured is placed in connection with the two connectors 106 as shown in FIG. 1b, the electric fields of the optical signals passing through the reference arm A and the sample arm B of the Mach-Zehnder interferometer 100 are represented as in the following formulae 8 and 9, respectively:

$$E_A' = E_0 \exp(-j\beta_A L_A) \cdot \exp[-j2\pi f(T_0 + \Delta T)] \cdot \exp(j2\pi f t) \qquad \text{Formula 8}$$

and $$E_B' = aE_0 \exp(-j\beta_S L_S) \cdot \exp(-j\beta_B L_B) \cdot \exp(j2\pi f t) \qquad \text{Formula 9}$$

Here, $\beta_S$ refers to the wave propagation constant of the optical signal that travels in the optical waveguide 400, and $L_S$ refers to the length of the optical waveguide 400.

Then, the intensity of the optical signal output at the output port 108 after passage through the Mach-Zehnder interferometer 100 is written as shown in the following formula 10.

$$I_S(f) = |E_0|^2(1+a^2) + 2a|E_0|^2 \cos(\psi(f)) \qquad \text{Formula 10}$$

Here, the phase difference $\psi(f)$ between the optical signals passing through the two arms A and B, respectively, after transmission through the interferometer can be represented as shown in the following formula 11.

$$\psi(f) = (\beta_A L_A - \beta_B L_B) + 2\pi f(T_0 + \Delta T) - \beta_S L_S = 2\pi f[\tau_{AB}(f) + (T_0 + \Delta T)] - \beta_S L_S \qquad \text{Formula 11}$$

If the relationship defined in the formula 7 is used in the formula 11, the formula 11 is simplified as shown in the following formula 12.

$$\psi(f) = \phi(f) + 2\pi f \Delta T - \beta_S L_S \qquad \text{Formula 12}$$

If we take a second derivative on the formula 12 with respect to the frequency f, we obtain a relationship shown in the following formula 13.

$$\frac{d^2 \psi(f)}{df^2} = \frac{d^2 \phi(f)}{df^2} - \frac{d^2 \beta_S(f)}{df^2} L_S \qquad \text{Formula 13}$$

Here, the second differential form of the wave propagation constant of an optical signal that travels in the optical waveguide 400 is related to the change of the group velocity $V_g$ (=$L_S/\tau_s$) with wavelength variation in the optical waveguide, which is the chromatic dispersion. These relationships can be represented as the following formulae 14 and 15.

$$\frac{d\beta_S(f)}{df} \equiv \frac{2\pi}{v_g(f)} \qquad \text{Formula 14}$$

$$\tau_S(f) = \frac{L_S}{v_g(f)} = \frac{L_S}{2\pi}\frac{d\beta_S(f)}{df} \qquad \text{Formula 15}$$

Thus, the time delay in the optical waveguide 400 is related to the group velocity as shown in the formula 15. Since the chromatic dispersion is defined as the change rate of time delay per unit length of sample with wavelength variation, the chromatic dispersion of the waveguide can be calculated by using the following formula 16.

$$D_\lambda(f) \equiv \frac{1}{L_S}\frac{d\tau_S(f)}{d\lambda} = -\frac{1}{L_S}\frac{c}{\lambda^2}\frac{d\tau_S(f)}{df} \qquad \text{Formula 16}$$

$$= -\frac{1}{2\pi}\frac{c}{\lambda^2}\frac{d^2\beta_S(f)}{df^2}$$

Here, the result of the formula 15 and a formula $$\frac{1}{d\lambda} = -\frac{c}{\lambda^2}\frac{1}{df}$$

are used. Moreover, if the result of the formula 13 is put in the formula 16, the formula 17 can be obtained.

$$D_\lambda(f) = -\frac{1}{2\pi}\frac{c}{\lambda^2 L_S}\left[\frac{d^2\phi(f)}{df^2} - \frac{d^2\psi(f)}{df^2}\right] \qquad \text{Formula 17}$$

On the other hand, if the Taylor series at a frequency $f_0$ is developed for the phase difference $\psi(f)$ of the formula 11, it can be written as shown in the following formula 18, similar to one shown in the formula 6.

$$\psi(f) = \psi(f_0) + \left|\frac{d\psi}{df}\right|_{f=f_0} \cdot (f - f_0) + \qquad \text{Formula 18}$$

$$\frac{1}{2}\left|\frac{d^2\psi}{df^2}\right|_{f=f_0} \cdot (f - f_0)^2 + \frac{1}{6}\left|\frac{d^3\psi}{df^3}\right|_{f=f_0} \cdot (f - f_0)^3 + \ldots$$

If we take the second derivative on the formulae 6 and 8 for the first to third terms with respect to the frequency f and put the results into the formula 17, the following formula 19 can be obtained.

$$D_\lambda(f) = -\frac{c}{\lambda^2 L_S}\frac{1}{2\pi}\left[\left|\frac{d^2\phi(f)}{df^2}\right|_{f=f_0} + \left|\frac{d^3\phi(f)}{df^3}\right|_{f=f_0} \cdot (f - f_0) - \right. \qquad \text{Formula 19}$$

$$\left. \left|\frac{d^2\psi(f)}{df^2}\right|_{f=f_0} - \left|\frac{d^3\psi(f)}{df^3}\right|_{f=f_0} \cdot (f - f_0)\right]$$

Another form of the formula 19, using a relationship $$f = \frac{c}{\lambda},$$

can be expressed in the wavelength domain as shown in the following formula 20.

$$D_\lambda(\lambda) = -\frac{c}{\lambda^2 L_S}\frac{1}{2\pi}\left[\left|\frac{d^2\phi(f)}{df^2}\right|_{f=f_0} + \left|\frac{d^3\phi(f)}{df^3}\right|_{f=f_0} \cdot \left(\frac{c}{\lambda} - \frac{c}{\lambda_0}\right) - \right. \qquad \text{Formula 20}$$

$$\left. \left|\frac{d^2\psi(f)}{df^2}\right|_{f=f_0} - \left|\frac{d^3\psi(f)}{df^3}\right|_{f=f_0} \cdot \left(\frac{c}{\lambda} - \frac{c}{\lambda_0}\right)\right]$$

Figure 3A:
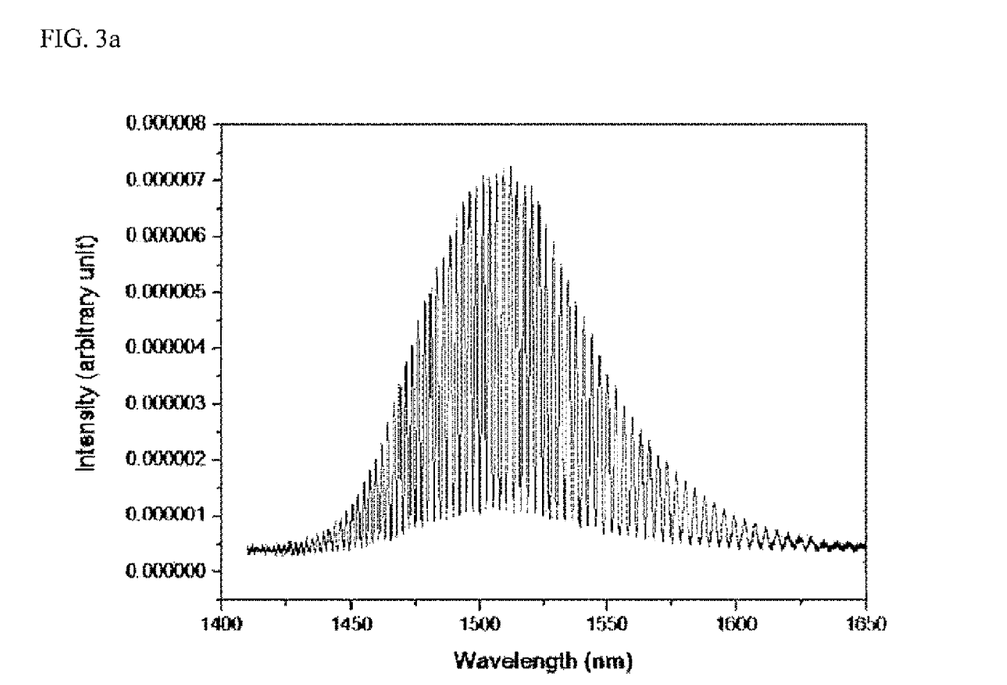
FIG. 3a and FIG. 3b are graphs showing the examples of interference pattern spectra measured by the interference pattern measuring system illustrated in FIG. 1a and FIG. 1b.
Figure 3B:
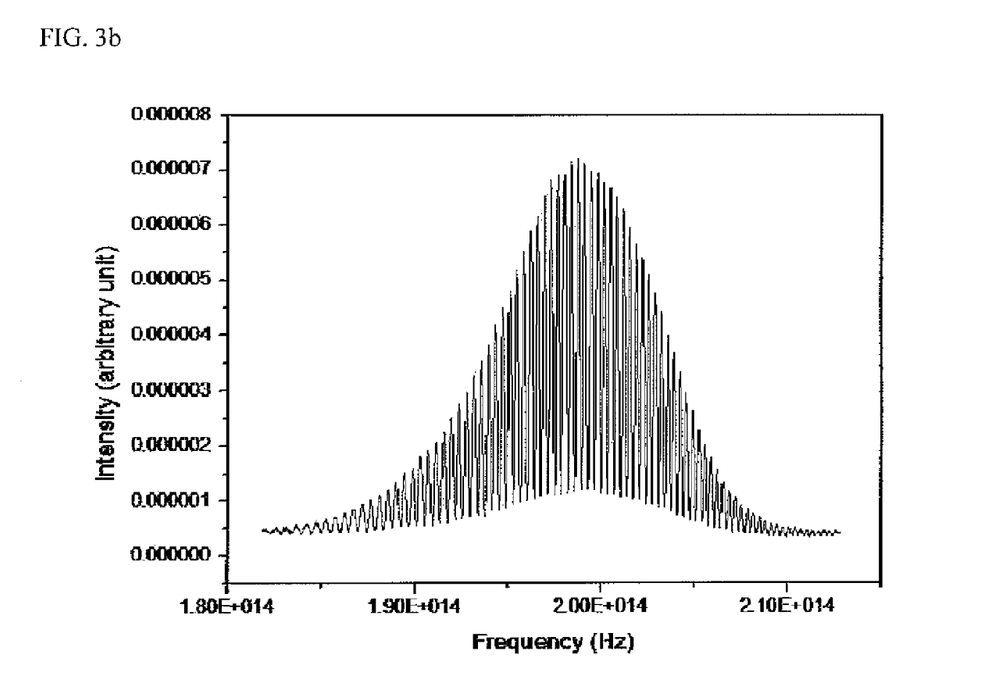

FIG. 3a and FIG. 3b are graphs showing the examples of interference pattern spectra measured by the interference pattern measuring system illustrated in FIG. 1a and FIG. 1b. In particular, FIG. 3a is an interference spectrum in a wavelength domain, and FIG. 3b is an interference spectrum in a frequency domain after the wavelength shown in FIG. 3a is converted to the frequency.

The phase of a particular peak point of the interference patterns is separated by $2\pi m$ from a predetermined reference peak when the particular peak is mth peak from the reference peak. Thus, the phase differences of the peak points of the interference patterns from the reference peak can be counted and recorded with its frequency values. Then, a curve fitting for the phase difference data of the interference peaks of each of the interference spectra is performed with the Taylor series functions of the formulae 6 and 18, and the coefficients of each frequency power term of the Taylor series are determined.

Figure 4:
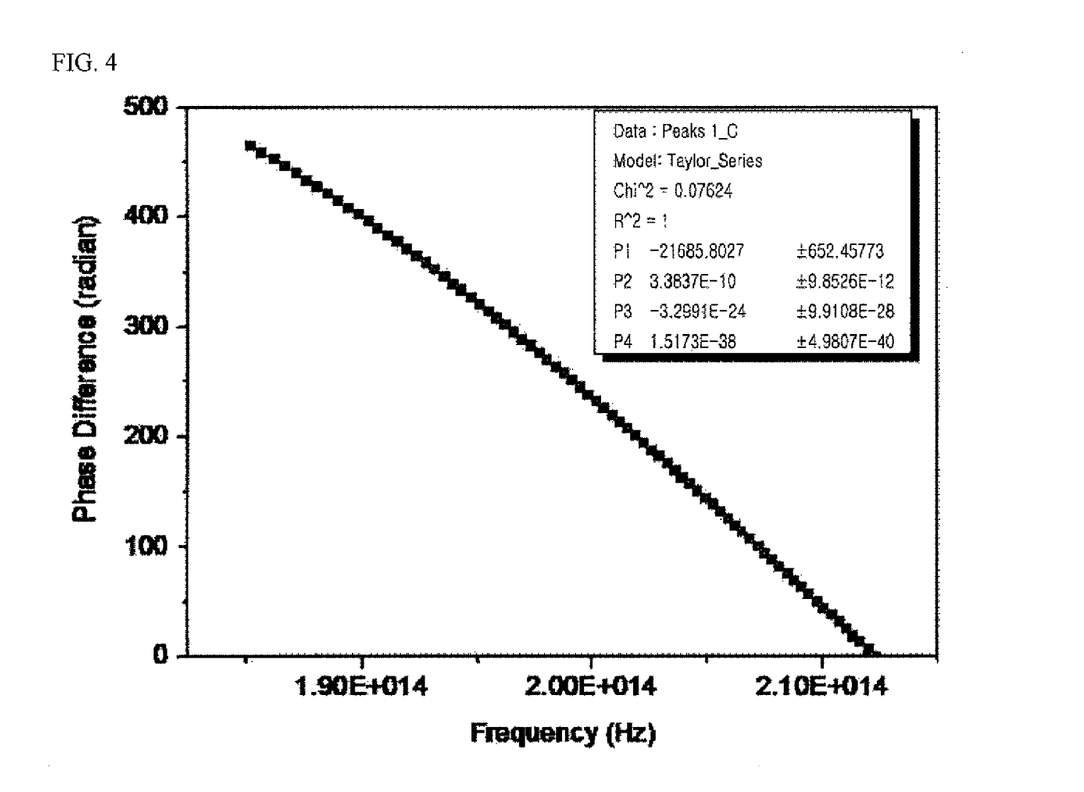
FIG. 4 is a graph showing the phase difference data as a function of frequency calculated by using peak points of the interference pattern spectrum shown in FIG. 3b.

FIG. 4 is an example of graph showing the phase difference data as a function of frequency calculated by using peak points of one interference spectrum out of two spectra shown in FIG. 3a and FIG. 3b.

In particular, FIG. 4 shows a Taylor series curve fitting curve on the phase difference data as a function of frequency calculated by using peak points of the single interference spectrum and the calculated Taylor series coefficients for zeroth power to third power terms of the frequency.

The values of $$\left|\frac{d^2\phi(f)}{df^2}\right|_{f=f_0}, \left|\frac{d^3\phi(f)}{df^3}\right|_{f=f_0}, \left|\frac{d^2\psi(f)}{df^2}\right|_{f=f_0} \text{ and } \left|\frac{d^3\psi(f)}{df^2}\right|_{f=f_0},$$

which correspond to the second and third power coefficients of the Taylor series and are obtained from the peak points of the interference spectra with and without the optical sample waveguide to be measured in the sample arm, can be used in the formula 20 to calculate its chromatic dispersion coefficient as a function of wavelength.

With this method it is possible to precisely obtain an absolute value of the chromatic dispersion coefficient of an optical waveguide sample to be measured, from the measured data without using any reference sample having already-known chromatic dispersion values on the reference arm.

Figure 5:
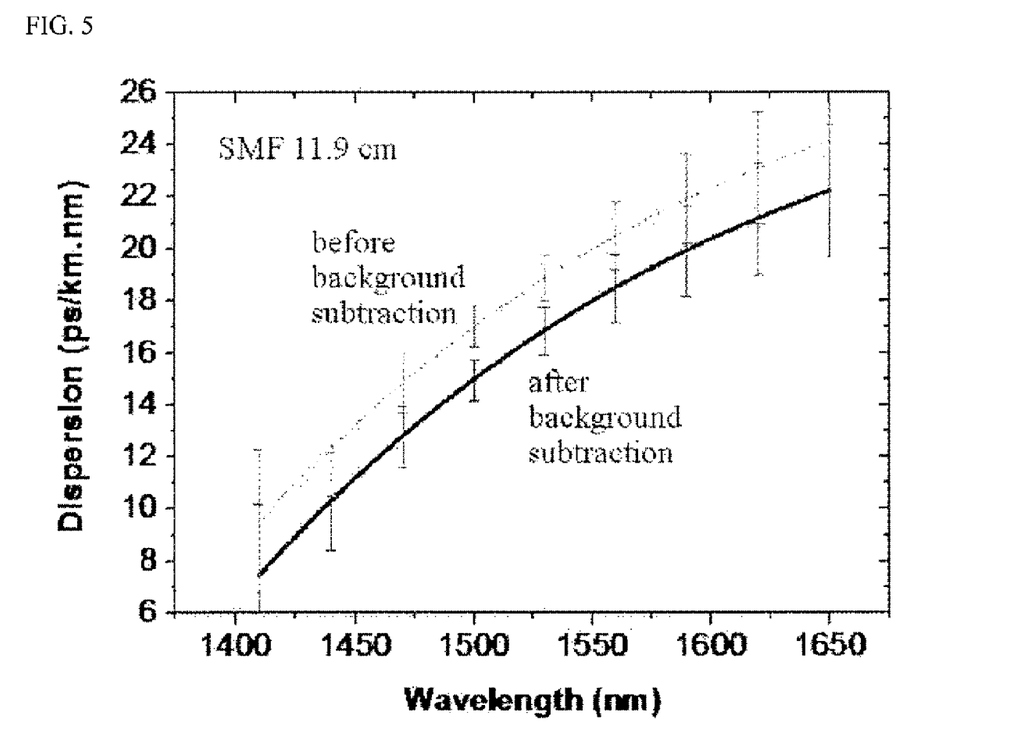

FIG. 5 shows plots of the chromatic dispersion coefficients of an optical waveguide sample calculated from the measured interference pattern and phase difference values when the sample is comprised in the interferometer as shown in FIG. 1b. In particular, FIG. 5 shows two plots of the chromatic dispersion coefficients of an optical waveguide sample with and without subtraction of background effect which can be obtained from the interference spectrum of no waveguide sample in the interferometer.

In other words, FIG. 5 compares the chromatic dispersion values calculated without $$\left|\frac{d^2\phi(f)}{df^2}\right|_{f=f_0} \text{ and } \left|\frac{d^3\phi(f)}{df^3}\right|_{f=f_0}$$

of the formula 20, both of which are obtained from the phase difference values of the interference pattern with no optical waveguide 400 in the interferometer, with those calculated after the subtraction of the background effect including those terms. The phase difference values between with and without an optical waveguide sample 400 are resulted from the background effect caused by the dispersion effect of the optical guided paths in the reference arm A and the sample arm B of the optical interferometer 100 even without any optical waveguide sample 400. If the background effect is not subtracted, this causes significant errors in the measurement and calculation of the chromatic dispersion coefficient of an optical fiber and optical waveguide having a very short length or a small chromatic dispersion value.

Figure 6A:
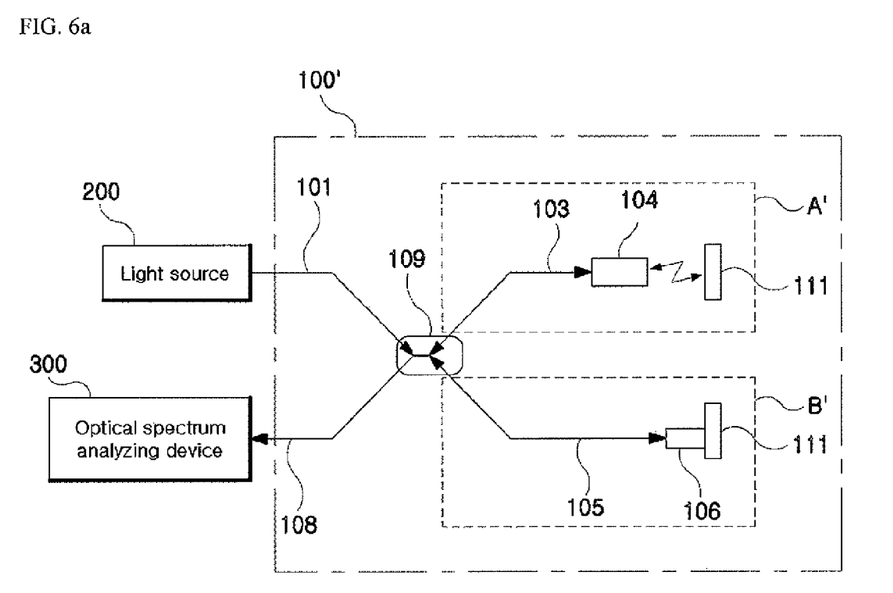
FIG. 6a and FIG. 6b show brief illustrative diagrams of another type of optical interference pattern measuring systems to explain another chromatic dispersion measuring method in accordance with an embodiment of the present invention.
Figure 6B:
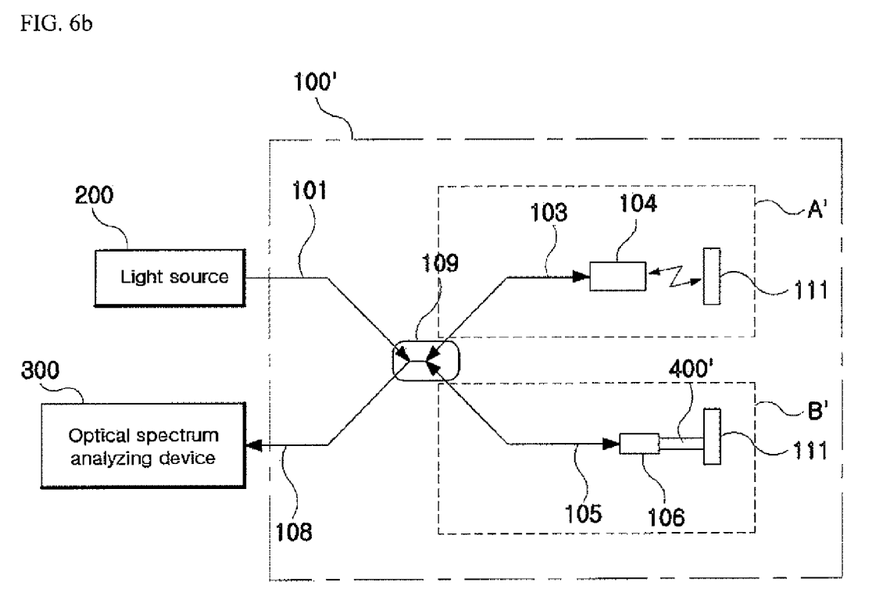

FIG. 6a and FIG. 6b show a brief schematic diagram of another interference pattern measuring system for measurement of the chromatic dispersion coefficients of an optical waveguide sample in accordance with an embodiment of the present invention. In particular, FIG. 6a shows the interference pattern measurement scheme with no optical waveguide sample connected, and FIG. 6b shows the interference pattern measurement scheme with an optical waveguide sample connected. Hereinafter, the similar elements of FIG. 6a and FIG. 6b to those of FIG. 1a and FIG. 1b are given similar reference numerals, and the pertinent description will be omitted.

The interference pattern measurement system shown in FIG. 6a and FIG. 6b reduces the optical signal transmission lengths of its two arms A and B in half by using reflectors 111, such as mirrors, on the output side of the Mach-Zehnder interferometer 100'. This type of interferometer is also called as "Michelson interferometer". An input port 101, an output port 108, an optically guided path of a reference arm 103, and an optically guided path of a sample arm 105 can be connected to a 2×2 optical beam splitter 109. The optical signal transferred from the input port 101 is split to the reference arm's optically guided path 103 and the sample arm's optically guided path 105. Then, the split signals are reflected by the reflectors 111, returned back through the reference arm's optically guided path 103 and the sample arm's optically guided path 105 to the beam splitter, and combined to interfere with each other before being transferred to the output port 108.

In the interference pattern measuring system, it may be required to control the distance between an optical collimator 104 and the reflector 111 in the reference arm in order to observe a clear interference pattern in an optical spectrum analyzing apparatus 300. Moreover, the length of an optical waveguide sample 400' can be reduced in half as compared with that of FIG. 1b.

A method of measuring the chromatic dispersion of an optical waveguide using the interference pattern measuring system shown in FIG. 6a and FIG. 6b is basically the same as that using a Mach-Zehnder interferometer described with reference to FIG. 1a and FIG. 1b. In this case, $T_0$ in the formulae 1 and 8 is replaced by a value that is twice of d/c because of an optical path of twice distance between the optical collimator 104 and the reflector 111, and $L_s$ in the formulae 19, 20, and 21 is replaced by $2L_s$ before being measured and calculated identically to those of FIG. 1a and FIG. 1b.

On the other hand, a chromatic dispersion slope (which is also called "a second-order chromatic dispersion") can be calculated by taking a derivative of the formula 20 with respect to the wavelength again, whose result is as shown in the following formula 21.

$$\frac{dD_\lambda(\lambda)}{d\lambda} = \quad \text{Formula 21}$$

$$-\frac{c}{\lambda^3 L_s}\frac{1}{\pi}\left[\left(\left|\frac{d^2\phi(f)}{df^2}\right|_{f=f_0} + \left|\frac{d^3\phi(f)}{df^3}\right|_{f=f_0}\cdot\left(\frac{c}{\lambda}-\frac{c}{\lambda_0}\right)\right) - \right.$$

$$\left.\left(\left|\frac{d^2\psi(f)}{df^2}\right|_{f=f_0} - \left|\frac{d^3\psi(f)}{df^3}\right|_{f=f_0}\cdot\left(\frac{c}{\lambda}-\frac{c}{\lambda_0}\right)\right)\right] +$$

$$\frac{c^2}{\lambda^4 L_s}\frac{1}{2\pi}\left[\left|\frac{d^3\phi(f)}{df^3}\right|_{f=f_0} - \left|\frac{d^3\psi(f)}{df^3}\right|_{f=f_0}\right]$$

By putting the coefficients obtained from the aforementioned Taylor series curve fitting in the formula 21, it is possible to precisely determine the chromatic dispersion slope (i.e. the second-order chromatic dispersion).

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

What is claimed is:

1. A measurement method of the chromatic dispersion of an optical waveguide sample using an optical interferometer, which enables an optical beam splitter to distribute optical signals transferred from a light source to a reference arm having an adjustable transmission length and to a sample arm connected to said optical waveguide sample to be measured and allows the distributed optical signals to meet at an optical beam combiner so that they form an interference pattern, comprising the steps of:

measuring first and second interference spectra of the optical beam output exiting from said interferometer with an optical spectrum analyzing apparatus when said optical waveguide is connected to said sample arm, and when said optical waveguide is not connected to said sample arm respectively, by adjusting the reference arm length for appearance of clear interference patterns and converting the wavelength-domain interference spectra into frequency-domain interference spectra;

calculating phase difference values of the interference spectra from a predetermined reference peak as a function of the frequency change by counting the interference peak (or valley) points;

finding two Taylor series curve fit functions, each of these for each set of the phase difference value data corresponding to each of the first and second interference spectra; and calculating a chromatic dispersion coefficient of the optical waveguide by using the coefficients of the Taylor series curve fit functions.

2. A method of claim 1, wherein, for a spectrum recorded in said analyzing step, said spectrum is taken with said optical spectrum analyzing apparatus in a condition that said transmission length of an optical signal of said reference arm is adjusted to observe a relatively clear interference pattern, whereas the condition that said transmission length of said optical signal through said reference arm is adjusted to observe a relatively clear interference pattern is any one of two cases; (a) the visibility of the interference pattern is the maximum or (b) differences between said background noise level and said maximum peak point level are of the maximum values.

3. A method of claim 1, wherein said reference arm comprises an optical beam collimator and an optical beam collector which transmits and receives an optical signal via air respectively, and said transmission length of said optical signal in air is adjusted by controlling distance between said optical beam collimator and collector; and at least one of the optical path between said optical beam collimator and said optical beam splitter and the optical path between said optical beam collector and an optical beam combiner is made of an optical fiber.

4. A method of claim 1, wherein said sample arm comprises connecting means for said beam splitter and for said beam combiner, each of which transfers said optical signal through connection with either end of said optical waveguide sample to be measured; and at least one of an optical path between said connecting means for said beam splitter and said optical beam splitter, and of an optical path between said connecting means for said combiner and said optical beam combiner is made of an optical fiber.

5. A method of claim 4, wherein said optical beam collimator and said optical beam collector are comprised of either one pair of optical collimators or GRIN lenses.

6. A method of claim 4, wherein said connecting means for said beam splitter and combiner are comprised of either one pair of optical connectors or fusion splice ports.

7. A method of claim 3, wherein optical beam splitter and combiner are comprised of optical fiber couplers.

8. A measurement method of a chromatic dispersion of an optical waveguide using an optical interferometer, wherein an optical signal from a light source is split into a reference arm having an adjustable transmission length and capable of reflecting back the transferred optical signal and into a sample arm at which said optical waveguide is connected and reflecting back the transferred optical signal, thereby enabling the reflected optical signals to meet each other at said optical beam splitter and to form a interference spectrum, and comprises the steps of:

measuring first and second interference spectra of the reflected and returned optical beam outputs at another input side optical port of the optical beam splitter or at the same optical beam input port with an optical circulator using an optical spectrum analyzing apparatus when said optical waveguide sample is connected to said sample arm, and when said optical waveguide sample is not connected to said sample arm respectively, by adjusting the reference arm length for appearance of clear interference patterns;

converting the wavelength-domain interference spectra into frequency-domain interference spectra and calculating phase difference values of the interference peaks of each of the spectra from a predetermined reference peak as a function of the frequency change by counting the interference peak (or valley) points;

finding a Taylor series curve fit function for each set of the phase difference data corresponding to each of the first and second interference spectra; and calculating a chromatic dispersion coefficient of the optical waveguide by using the coefficients of the Taylor series curve fit functions.

9. A method of claim 8, wherein, for a spectrum recorded in said analyzing step, said spectrum is taken with said optical spectrum analyzing apparatus in a condition that said transmission length of an optical signal of said reference arm is adjusted to observe a relatively clear interference pattern, whereas the condition that said transmission length of said optical signal through said reference arm is adjusted to observe a relatively clear interference pattern is any one of two cases; (a) the visibility of the interference pattern is the maximum or (b) differences between said background noise level and said maximum peak point level are of the maximum values.

10. A method of claim 8, wherein said reference arm comprises an optical beam collimator transmitting said optical signal from an optically guided path to air and an optical mirror reflecting said optical signal back to said collimator, and said transmission length of said optical signal in air is adjusted by controlling separation between said optical beam collimator and said mirror; and said optical path between said optical beam collimator and said optical beam splitter consists of an optical fiber.

11. A method of claim 8, wherein a sample path comprises a connecting means of an optically guided path to an end of said optical waveguide sample transferring optical signal to said optical waveguide and a reflector positioned closely to the other side of said optical waveguide sample reflecting said optical signal back to said collimator, and said optical path between said connecting means and said beam splitter is made of an optical fiber.

12. The method of claim 10, wherein said optical beam collimator is comprised of either an optical collimator or a GRIN lens.

13. The method of claim 11, wherein said connecting means are comprised of either an optical connector or a fusion splice port.

14. The method of claim 8, wherein said optical beam splitter is comprised of an optical fiber coupler.

* * * * *